United States Patent [19]

Carroll, Jr. et al.

[11] Patent Number: 4,732,954

[45] Date of Patent: Mar. 22, 1988

[54] NOVEL POLYVINYL CHLORIDE SUSPENSION POLYMERIZATION PROCESS AND PRODUCT HAVING IMPROVED PLASTICIZER ABSORPTION

[75] Inventors: William F. Carroll, Jr., Radnor; Stephen T. Fitzpatrick, Gilbertsville, both of Pa.

[73] Assignee: Occidental Chemical Corporation, Niagara Falls, N.Y.

[21] Appl. No.: 507,322

[22] Filed: Jun. 23, 1983

[51] Int. Cl.$^4$ .............................................. C08F 2/20
[52] U.S. Cl. ................................... 526/88; 526/200; 526/215
[58] Field of Search ............... 526/200, 199, 201, 202, 526/203, 88

[56] References Cited

U.S. PATENT DOCUMENTS

| | | | |
|---|---|---|---|
| 3,004,013 | 10/1961 | Kircher, Jr. | 526/202 |
| 3,042,665 | 7/1962 | Jankowiak | 526/221 |
| 3,125,557 | 3/1964 | Harris | 526/201 |
| 3,375,238 | 3/1968 | Bauer | 526/200 |
| 3,451,985 | 6/1969 | Mahlo | 526/216 |
| 3,627,744 | 12/1971 | Hopkins | 526/87 |
| 3,682,877 | 8/1972 | Czekay | 526/88 |
| 3,706,722 | 12/1972 | Nelson | 526/216 |
| 3,725,375 | 4/1973 | Sturt | 526/201 |
| 4,058,495 | 11/1977 | Serratore | 526/200 |
| 4,229,547 | 10/1980 | Cohen | 526/203 |
| 4,345,056 | 8/1982 | Thyret | 526/200 |
| 4,404,339 | 9/1983 | Bush | 526/88 |

FOREIGN PATENT DOCUMENTS 773737  5/1957  United Kingdom ................ 526/200

*Primary Examiner*—Christopher Henderson
*Attorney, Agent, or Firm*—James F. Tao; James F. Mudd

[57] ABSTRACT

A polyvinyl chloride having high bulk density and enhanced plasticizer absorption is produced by suspension polymerization of vinyl chloride monomer and comonomers wherein the initial suspension of ingredients is generated such that the oil phase droplets formed in the suspension are compositionally equivalent with respect to initiator, and the level of suspending agent and agitation are chosen to substantially preclude agglomeration of resin particles throughout the reaction, thereby producing resin wherein the resin grain size distribution results directly from the oil phase droplet distribution created at or near the start of the reaction. The process is conducted under conditions so that the polymerization is commenced before the final distribution is established. In this manner, seed particles of resin are produced from the vinyl monomer prior to establishing the final particle distribution. The seed particles can be formed (1) by first conducting the process at low speed agitation, followed by increasing the speed of agitation so as to distribute the resin seed particles in the droplets of vinyl monomer, or (2) by preheating the aqueous medium prior to mixing with the vinyl monomer phase so as to initiate polymerization and formation of seed particles before the vinyl monomer droplets achieve their ultimate droplet size. The result of the processes of the invention is a polyvinyl chloride polymer or copolymer that has high bulk density and enhanced plasticizer absorption. A further benefit of the process is that resin deposition on the interior surfaces of the reactor is essentially eliminated.

9 Claims, No Drawings

NOVEL POLYVINYL CHLORIDE SUSPENSION POLYMERIZATION PROCESS AND PRODUCT HAVING IMPROVED PLASTICIZER ABSORPTION

BACKGROUND OF THE INVENTION

The invention is directed to a process for the suspension polymerization of vinyl chloride monomer to produce vinyl chloride resin. In the suspension polymerization of vinyl chloride monomer, it is customary to mix a large volume of water together with suitable suspending agents, an initiator and the vinyl chloride monomer in a reactor under suitable agitation. The mixing of the foregoing reaction ingredients results in the formation of droplets of vinyl chloride monomer in the aqueous medium. When no special care is taken as to the order of addition of the various components, the droplets have various concentrations of initiator depending on the random nature in which the initiator distributed itself when the body of vinyl chloride monomer was dispersed in the aqueous medium by the agitator. Under these circumstances, as the polymerization proceeds, various size particles are formed as a result of the agglomeration of the initially formed particles, varying from lumps down to tiny particles usually referred to as "fines". The resulting polymer product upon recovery from the process is a heterogeneous mixture of particles of various sizes and shapes. The particles have a wide particle size distribution and have a relatively low bulk density. The conventional process also results in the formation of polyvinyl chloride resinous deposits or scale on the walls of the reactor to such an extent that it is ordinarily necessary to open the reactor after every one or more production runs so that the reactor scale can be removed from the walls.

U.S. pending application Ser. No. 204,739, filed Nov. 7, 1980, now abandoned is directed to a novel suspension polymerization process for producing polyvinyl chloride resin. The process is carried out under conditions such that the initial suspension of monomer droplets is formed so that the monomer droplets have equivalent amounts of initiator accessible to the monomer droplets. The level of suspending agent and agitation are chosen to preclude agglomeration of the initially formed droplets to produce a resin whose grain size distribution results directly from the monomer droplet distribution created at the start of the reaction. The process results in formation of nearly uniform spherical particles that have a narrow grain size distribution. The particles are substantially free of sub-grains because agglomeration has not occurred during the process. Resin deposition on the interior surfaces of the reaction vessel is essentially eliminated. The resulting resin particles have a desirable high bulk density which facilitates their use in extrusion processes. The spherical nature of the particles improves their flowability.

The process of copending application Ser. No. 204,739, involves the following steps:

(1) separately mixing (a) a polymerization initiator and other oil soluble additives with a vinyl chloride monomer, and (b) suspending agent and other water soluble additives with the aqueous phase,
(2) introducing the two phases into a polymerization zone,
(3) initiating agitation to disperse the oil phase as droplets of vinyl monomer having a uniform concentration of initiator,
(4) heating the reactor to an elevated temperature while maintaining agitation until the reaction proceeds to a high conversion of monomer,
(5) stripping residual vinyl monomer, and
(6) drying the polyvinyl chloride produced.

In the foregoing process, the level of suspending agent and agitation are chosen to substantially preclude agglomeration of particles throughout the reaction thereby producing a resin wherein the resin grain size distribution results directly from the oil phase droplet distribution created at the start of the reaction. In the process just described, no significant amount of polymerization begins until after the oil phase droplet distribution is established.

While the just described process has many advantages as set forth above, the process produces particles with a pericellular membrane or skin on the surface of the particle which reduces plasticizer absorption. The particles of the process are excellent for applications such as extrusion of the resin to produce shaped articles, but the product is not well suited for applications requiring inclusion of a plasticizer. Accordingly, it is an object of this invention to modify the process of the copending application Ser. No. 204,739, so that it will produce a product having improved plasticizer absorption.

SUMMARY OF THE INVENTION

Polyvinyl chloride particles that have all the advantages of the above-described process disclosed in copending application Ser. No. 204,739, and additionally have enhanced plasticizer absorption are produced by conducting the process so that polymerization is commenced before the final particle distribution is established. In this manner, seed particles of resin are produced from the vinyl monomer prior to establishing the final droplet distribution. The presence of these seed particles in the oil phase or monomer droplets result in the formation of a resin particle that has enhanced plasticizer absorption.

The vinyl resin seed particles can be formed in several ways. In one embodiment of the invention, after the separately prepared aqueous and oil phases are introduced to the reaction zone, agitation is commenced at a slow speed to begin the formation of large oil phase droplets while the reaction mixture is being heated to initiate polymerization. When the polymerization has proceeded to only a very low conversion of about 0.25 to 10%, preferably about 1 to 5%, the agitation speed is increased to the normal speed for producing droplets having the desired resin product particle size. The increased agitation breaks up the originally formed droplets and the initially formed resin is distributed as seed particles to the newly formed droplets, and polymerization continues to the desired conversion level. The level of suspending agent and the higher speed agitation level are chosen to substantially preclude agglomeration of particles throughout the remainder of the reaction, thereby producing a resin wherein the resin grain size distribution results directly from the oil phase droplet distribution formed when the agitation level is increased. The oil phase droplets shrink during polymerization as a result of the density of the polymer being greater (about 1.4) than the density of the monomer (about 0.9). In this embodiment of the invention, the final oil phase droplets are created after a significant amount of polymerization has taken place.

In another embodiment of the invention, the aqueous phase containing the suspending agent and other additives, or the water itself prior to addition of the suspending agent and other additives, is heated to an elevated temperature, preferably above reaction temperature, prior to mixing the aqueous phase with the oil phase. Thereafter, the two phases are introduced to the reaction zone, and agitation is commenced at a level to form the desired droplet size distribution. As a result of preheating the aqueous phase, polymerization commences rapidly upon mixing the aqueous and oil phases. The initially formed resin particles are distributed as seed particles to the ultimately formed droplets and polymerization continues to the desired conversion level. The level of suspending agent and agitation are chosen to substantially preclude agglomeration of particles throughout the remainder of the reaction, thereby producing a resin wherein the resin grain size distribution results directly from the oil phase droplet distribution formed initially in the reaction mixture. The oil phase droplets actually shrink during polymerization as a result of the density of the polymer being greater (about 1.4) than the density of the monomer (about 0.9). In this embodiment of the invention, polymerization of the monomer commences while the final oil phase droplet distribution is being established. The final oil phase droplets are created while polymerization is taking place at a significant rate.

In still another embodiment of the invention, both the preheating of the aqueous phase and slow initial agitation speed are employed to form resin seed particles that are distributed to the ultimately formed oil phase droplets as in the preceding embodiments of the invention.

DETAILED EMBODIMENTS OF THE INVENTION

The Reaction Components

Vinyl chloride is the preferred monomer of the invention. Vinyl chloride monomer that is greater than 95% pure is preferably utilized as the monomer in the oil-soluble solution. In many commercial processes, recycled vinyl chloride monomer is utilized, and the process of the invention accommodates this custom. Reaction kinetics must be optimized to account for the reactive impurities in recycle streams. Generally, if a recycle stream contains less than about 5 percent impurities it can be utilized as monomer without further treatment, depending upon the identity of the impurities.

Various comonomers can be used with the vinyl chloride monomer generally in a proportion of up to about 50 weight percent of the total monomer component. Suitable comonomers include unsaturated esters including vinyl esters such as vinyl acetate, vinyl propionate, vinyl butyrate and vinyl benzoate; alkyl methacrylates, such as methyl methacrylate; alkyl acrylates, such as 2-ethylhexyl acrylate. Many other suitable comonomers are disclosed in U.S. Pat. No. 4,007,235, the disclosure of which is incorporated herein by reference.

The initiators used in the process are free radical initiators and can be any of the commonly utilized peroxy compounds. Suitable peroxy compounds include diacylperoxides like dilauroylperoxide, didecanoylperoxide, dibenzoylperoxide and others (although not necessarily symmetric); peroxyesters like cumylperneodecanoate, t-butylperneodecanoate, cumylperipivalate and others., peroxydicarbonates like isopropylperoxydicarbonate, sec-butylperoxydicarbonate, 2-ethylhexylperoxydicarbonate, dicetylperoxydicarbonate and others (although not necessarily symmetric); azo compounds like azoisobutyronitrile and other (although not necessarily symmetric) or any essentially oil-soluble free radical initiator commonly utilized for vinyl polymerization. Initiator(s) and level(s) are selected to provide a uniform rate of reaction over the desired reaction time.

Additives can be used on a selective basis in the aqueous or oil phases. Additives include secondary suspending agents such as glycerol monolaurate, sorbitan monolaurate, sorbitan monostearate, functionalized cellulosics like hydroxypropylcellulose, low hydrolysis (20–40%) poly (vinyl acetate) and others; antioxidants like butylatedhydroxytoluene, substituted phenols, triodipropionate esters, phosphites and others; chaintransfer agents, capable of modifying polymer molecular weight, such as trichloroethylene, 1,2-dichloroethylene, t-dodecylmercaptan, mercaptoethanol and others.

Primary suspending agents that can be incorporated into the solution containing water solubles include any of the commonly utilized suspending agents such as modified cellulose polymers like hydroxypropylmethylcellulose of various molecular weights, high hydrolysis (60–95%) poly(vinyl acetate), and water-soluble natural product polymers such as guar gum or gelatin.

Optional chelating agents that can be incorporated into the solution containing water-solubles are any of the common materials that give rise to ligands capable of binding multivalent metal ions. Examples are alkali metal or ammonium salts of ethylenediaminetetraacetic acid (EDTA) or nitrilotriacetic acid (NTA). Chelating agents are not absolutely necessary, but have been found to help maintain reactor cleanliness. Buffering systems can also be used to control pH in the aqueous phase.

Table 1 summarizes the proportions in which the reaction components are employed in the processes of the invention.

TABLE 1

| REACTION COMPONENTS | BROAD RANGE | PREFERRED RANGE |
| --- | --- | --- |
| Water phm | 80–300 | 120–170 |
| Initiator phm | 0.002–0.2 | 0.002–0.2 |
| Primary Suspending Agent phm | 0.03–3 | 0.05–0.2 |
| Secondary Suspending Agent phm | 0–0.5 | 0–0.2 |
| Chelating Agent phm | 0–0.5 | 0–0.25 |

Reaction Variables

In the process of our invention, a technique known as "reverse charge" is utilized to polymerize the vinyl chloride monomer and any comonomers. Reverse charge is herein defined as that system providing homogeneous mixing of oil-soluble and water-soluble ingredients in separate phases or vessels before creation of a suspension. It is important to note a variation of this procedure which has also proved effective: premixing oil and water-soluble materials in separate charge stages, delivering appropriate amounts of each material in a single pipe, then creating a suspension by means of a pipeline mixer before final deposition into a reaction vessel. Our preferred embodiment is chosen because little or no modification of commercial equipment and processes is required for its utilization.

Sequence of addition of ingredients is important, but any selected sequence capable of providing compositionally uniform droplets is acceptable. Moreover, not all additions of ingredients need be made at the beginning of the reaction: for example, additional monomer can be added continuously or incrementally to the system so long as suspension stability is maintained and no significant new droplet family is generated.

Bulk addition of oil-soluble initiator to an agitated mix of monomer in the aqueous phase, a normal charge, produced poor resin in that not every monomer-containing droplet contains initiator early in the reaction. Droplets containing high concentrations of initiator can proceed to polymer at high conversion early in the reaction. This can cause abnormally large or discolored resin grains, an unacceptable result.

It has long been known that agitation is, in a large measure, responsible for establishment of the suspension droplet size distribution; suspending agent identity and level are other important variables. Ordinarily, however, agitation is kept at a high level and suspending agent at a low level result, the initial droplets are poorly proteted by suspending agent. As the reaction progresses, resin grains become unstable and tend to agglomerate.

In the preferred embodiment, agitation and suspending agent levels are modified to avoid just such agglomeration. In order to do this, certain optimizations must be carried out in a given reactor, as agitation depends not only on stirring rate and agitator design but also reactor geometry and baffling. In our laboratory reactors, (glass or stainless steel, 1½ liter capacity, inverted-T stirrer) stable batches can be obtained by charging 0.1 parts per hundred parts of monomer (phm) of a cellulosic suspending agent and by establishing suspension droplets with a 375 rpm stirring rate. Additionally, suspensions appear to be essentially unresponsive to increased stirring rate when carried beyond 20-30% conversion, and to decreased stirring rate significantly earlier.

In general, it is advisable to have a narrow grain size distribution as determined by screen analysis. Our preferred embodiment as mentioned above yields a product whose grain size distribution can be more effectively controlled; normal reactions will ordinarily yield broader distributions.

Normally a mixture is heated to a preselected temperature after agitation is begun. As noted hereinbefore, certain embodiments of the invention involve preheating the aqueous phase prior to admixture with the oil phase. The reaction temperature, which controls the rate of thermolysis of the free radical initiator and, therefore, the reaction rate, as well as the molecular weight of the resin itself, is maintained by removal of heat of reaction by any of the conventionally used procedures. These procedures include the use of condensers, cooled jacket or baffles and the like.

"Pressure drop" describes the point in a reaction when monomer concentration is no longer great enough to saturate polymer at a given temperature. Pressure drop usually occurs at greater than 70% conversion. To attain maximum bulk density, as in our preferred embodiment, the reaction is allowed to continue to slightly higher (75 to 80 percent) conversion because it is well known that reaction conversion has a large effect upon resin porosity and bulk density. However, the reaction can be stopped at conversions as low as 60 percent, and can proceed to conversions as high as 95 percent. Monomer removal by conventional strippng is ordinarily made more difficult, however, by high conversion.

After stripping, resin is dewatered and dried using any conventional process, for example, by centrifugation and drum drying. Wetcake water content is inversely proportional to resin bulk density. Dried resin can then be packaged or stored in bulk.

Table 2 summarizes the reaction conditions employed in the processes of the invention.

TABLE 2

| REACTION CONDITIONS | BROAD RANGE | PREFERRED RANGE |
| --- | --- | --- |
| Reaction Temperature °C. | 30–80 | 40–65 |
| Agitation RPM | 30–400 | 40–100 |
| Solids content in reactor % | 25–55 | 35–50 |
| Time Hour | 2–12 | 4–8 |

In those embodiments in which the aqueous medium is preheated, the preheating temperature is in the range of about 40° to 80° C.

In those embodiments in which slow speed agitation is employed in the initial portion of the reaction, the initial agitation speed is about 20 to 150 RPM, preferably about 20 to 60 RPM.

Properties and Advantages

The products of the processes of the invention are characterized by high bulk density particles having good dryness. The particles are spherical in shape which improves their flowability. The particles of the processes have narrow particle size distribution which results from the substantial lack of agglomeration of particles that occurs during the processes. By contrast, commercially available resins are characterized by grains which in turn consist of sub-grains that have agglomerated during the polymerization. This agglomeration results in a wide variety of particle size distribution which is avoided by the processes of the present invention.

The processes of the invention result in little or no buildup of the polymer scale on the walls of the reaction zone. Again, this is in contrast to conventional vinyl chloride suspension processes which are characterized by production of undesirable polymer buildup upon an exposed interior surface of the reaction vessel including the walls, agitator and baffles.

The processes of the invention facilitate stripping of the unreacted vinyl chloride monomer and result in decreased manufacturing costs in the production of the resin product.

The processes of the invention result in a superior polymer product that is characterized by enhanced plasticizer absorption, which coupled with its other valuable properties has a wide range of utility.

The uniquely spherical, regular particle morphology of this resin makes it highly flowable and easy to handle.

A less preferred application for the resins of the invention is in the manufacture of pipe, conduit and siding by extrusion process. Higher extrusion rates, proportional to increased bulk density, are achieveable in twin-screw extruders.

The following examples are intended to illustrate the invention but not to limit its scope. Wherever used in this specification and claims, parts and proportions are by weight and temperatures are in degrees Celsius, unless indicated otherwise.

In the following examples, the extent of plasticizer absorption of the polyvinyl chloride products was measured by the "dryness time" or time for plasticizer to be absorbed into a particulate sample of the polyvinyl chloride using the following test procedure. The bulk density of the polyvinyl chloride products was also determined. The procedure is a modified form of ASTM Test D 2396-79.

In the test procedure, the PVC resin in particle form and a filler mixture are added to the Sigma head (type 3S300C or equivalent) of a Brabender Plasti-Corder (Model PLV-2 or equivalent) and premixed for 5 minutes at a head temperature of 81.0°±0.2° C. The Plasticorder is operated at a speed of 60 RPM. Then, 103 grams of a plasticizer and stabilizer mixture are added to the resin-filler mixture. This results in a pasty mixture and an increased torque. The blend returns to a free-flowing state as the plasticizer is absorbed into the resin particles, as evidenced by decreased torque. The time for the plasticizer-stabilizer-resin mixture to return to a free-flowing state is recorded as the "dryness time". A hot, tamped bulk density is then determined on the blend after it is removed from the Sigma head. In this procedure, there are employed 200 grams of PVC resin, 85 grams of Atomite or Camelwite filler which are mixed prior to addition of the plasticizer-stabilizer mixture and mixed for five minutes. The plasticizer-stabilizer mixture comprises 420 grams of diisodecyl phthalate, 60 grams of Monoplex S-73 (Rohm and Haas Company), 30 grams of Mark 180 (Argus Chemical Company) and 5 grams of Mark PL (Argus Chemical Company). The dryness time of each blend is reported as the number of minutes from the addition of the plasticizer-stabilizer mixture to the dry point. The dry point is determined by the intersection of the straight lines drawn through the final level portion of the torque curve and through the descending portion of the curve immediately preceeding on the plasticorder recording chart. A sample of the resin blend is removed from the apparatus into a 100 cc. graduated cylinder for determination of the bulk density by tamping the powdered mixture by raising the graduate one inch above a board and letting it fall back against the board for eight times. The density is calculated from the volume and weight of the resin sample after tamping.

PVC resins that are useful in "flexible" applications such as films, generally have a dryness time of up to about 18 minutes in accordance with the foregoing test, preferably up to about 10 minutes. Resins with higher dryness times are useful in rigid applications such as molded articles.

EXAMPLE 1

0.036 parts by weight of sec-butyl peroxydicarbonate, and 100 parts by weight of vinyl chloride were charged to a reactor at 25 degrees Celsius and thoroughly mixed. Then, 170 parts by weight of water, 0.058 parts by weight of disodium EDTA and 0.3 parts by weight of Methocel K-100 (suspending agent made by Dow Chemical Company) were added to the reactor with no stirring. Thereafter, slow speed agitation (110 RPM in a laboratory reactor) was begun and the reaction mixture was gradually heated to 49 degrees Celsius over a 30 minute period. Then, 0.3 part by weight of Methocel E-5 (suspending agent made by Dow Chemical Company) was added with 30 parts by weight of water. After 2 minutes, the agitation was increased to high speed (350 RPM in a laboratory reactor), and the reaction was completed at 55 degrees Celsius. The reaction terminated by venting the unreacted vinyl chloride when the pressure of the vinyl chloride monomer decreased by 5 to 10 psi. The resulting resin had a bulk density of 0.533 g/cm$^3$, and a dryness time of 11.3 minutes.

EXAMPLE 2

186 parts by weight of water, 0.0093 part by weight of Resorcinol and 0.27 part by weight of Methocel F-50 (suspending agent made by Dow Chemical Company) were added to a reactor which was then thoroughly purged of oxygen and heated to 60 degrees Celsius. Then, 0.16 part by weight of dicetyl peroxydicarbonate was dissolved in 0.8 part by weight of hexane and the resulting solution was dispersed in 100 parts by weight of vinyl chloride monomer. The resulting vinyl chloride monomer solution was added to the reactor which was agitated at high speed (250 RPM in a 1500 ml laboratory reactor). The reaction was run at 53.5 degrees celsius until the pressure had fallen about 18 psi from its equilibrium value. Unreacted vinyl chloride was vented from the reactor. The polymer product was recovered and dryed in air at about 60 degrees Celsius. The resulting resin had a bulk density of about 0.54 g/ml, and a dryness time of 15.7 minutes.

EXAMPLE 3

200 parts of water, 0.07 part of Methocel F-50, 0.12 part Klucel J (hydroxypropyl cellulose, made by Hercules), and 0.00125 part sodium nitrite were added to a 500 gallon stainless steel reactor. The reactor was evacuated to remove air, and 13 parts of vinyl chloride were added. The reactor was heated to 149° F. In a separate vessel, 87 parts of VCM, 0.05 part sec-butylperoxydicarbonate, 0.0025 part -methyl styrene, and 0.03 part sorbitan monolaurate were mixed together. The resulting solution was added to the preheated reactor with an agitation speed of 80 RPM. The batch was reacted at 128° F. until the batch pressure had fallen by 5-10 PSI from its equilibrium value. Unreacted monomer was vented from the reactor, and the slurry was stripped, dewatered and dried. The resulting resin had a bulk density of 0.56 g/cc and a dryness time of 7.5 minutes.

EXAMPLE 4

The procedure described in Example 3 was repeated, except 0.12 parts of sorbitan monolaurate was added instead of 0.03 part. The resin from this polymerization had a bulk density of 0.49 g/cc and a dryness time of 6.8 minutes.

When the features of the invention are not employed in the process, dryness times are unacceptably high for the resin to be used as a flexible resin. However, it might be a useful rigid resin. In one such case, the product had a dryness time of 40.3 minutes. In other cases, the plasticizer does not appear to be absorbed at all.

We claim:
1. A process for the suspension polymerization of vinyl halide monomer which comprises the following steps:
   (1) preparing a solution of polymerization initiator and other oil-soluble additives in the viny halide monomer;
   (2) preparing a solution of suspending agent and other water-soluble additives in water,
   (3) mixing solutions (1) and (2) in a polymerization reaction zone with a sufficient level of agitation to produce oil-phase droplets that are larger than the desired final product particle size;

(4) heating the reaction mixture to an elevated temperature while maintaining the agitation substantially at the level established in step (3) until the reaction proceeds to a conversion of about 0.25 to 10 percent;

(5) increasing the level of agitation to form oil-phase droplets commensurate in size to the desired product particle size and continuing the polymerization reaction until the reaction proceeds to a monomer conversion of about 60 to 95 percent; and (6) recovering the resin product produced;

wherein the levels of suspending agent and agitation are chosen to substantially preclude agglomeration of resin particles during the reaction; thereby producing resin wherein the resin grain size distribution results directly from the oil phase droplet distribution created in step (5).

2. The process of claim 1 wherein the proportion of suspending agent is in the range of about 0.03 to 3 parts by weight per hundred parts by weight of monomer.

3. The process of claim 2 wherein the proportion of initiator is in the range of about 0.002 to 0.2 parts by weight per hundred parts by weight of monomer.

4. The process of claim 3 wherein a secondary suspending agent is employed in a proportion of up to about 0.5 part by weight per hundred parts by weight of monomer.

5. The process of claim 4 wherein a chelating agent is employed in a proportion of up to about 0.5 parts by weight per hundred parts by weight of monomer.

6. A process for the suspension polymerization of vinyl chloride monomer which comprises the following steps:

(1) preparing a solution of polymerization initiator in the vinyl chloride monomer in a proportion of about 0.002 to 0.2 part by weight of initiator per 100 parts by weight of monomer;

(2) preparing a solution of suspending agent in water in a proportion of about 0.08 to 0.2 parts by weight of suspending agent per 100 parts by weight of monomer;

(3) mixing solutions (1) and (2) in a polymerization reaction zone with a sufficient level of agitation to produce oil-phase droplets that are larger than the desired final product particle size;

(4) heating the reaction mixture to a temperature of about 40° to 90° C. while maintaining the agitation substantially at the level established in step (3) until the reaction proceeds to a conversion of about 0.1 to 5 percent;

(5) increasing the level of agitation to form oil-phase droplets commensurate in size to the desired product particle size and continuing the polymerization reaction until the reaction proceeds to a monomer conversion of about 60 to 95 percent;

(6) stripping residual vinyl monomer from the reaction mixture, and (7) drying the resin product produced;

wherein the levels of suspending agent and agitation are chosen to substantially preclude agglomeration of resin particles during the reaction; thereby producing resin wherein the resin grain size distribution results diretly from the oil phase droplet distribution created in step (5).

7. The process of claim 6 herein a secondary suspending agent is employed in a proportion of up to about 0.5 part by weight per hundred parts by weight of monomer.

8. The process of claim 7 wherein a chelating agent is employed in a proportion of up to about 0.5 parts by weight per hundred parts by weight of monomer.

9. The process of claim 1 wherein the vinyl halide also contains up to about 50 weight percent of a comonomer based on the total weight of monomer component.

* * * * *